Aug. 9, 1955     W. T. MARSTON     2,714,955
HYDRAULIC CLASSIFIER
Filed Dec. 9, 1953     12 Sheets-Sheet 1
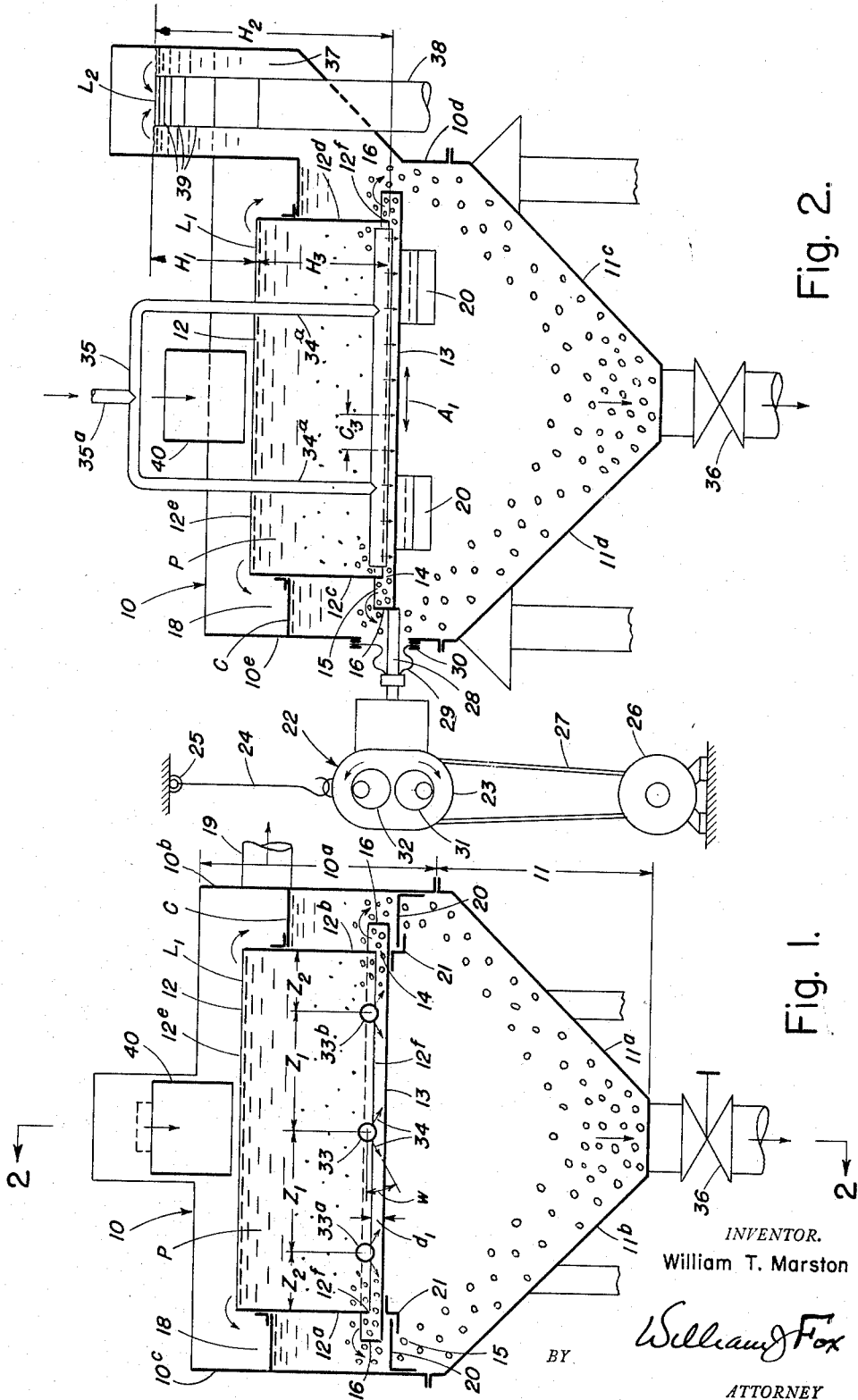
INVENTOR.
William T. Marston
BY William Fox
ATTORNEY

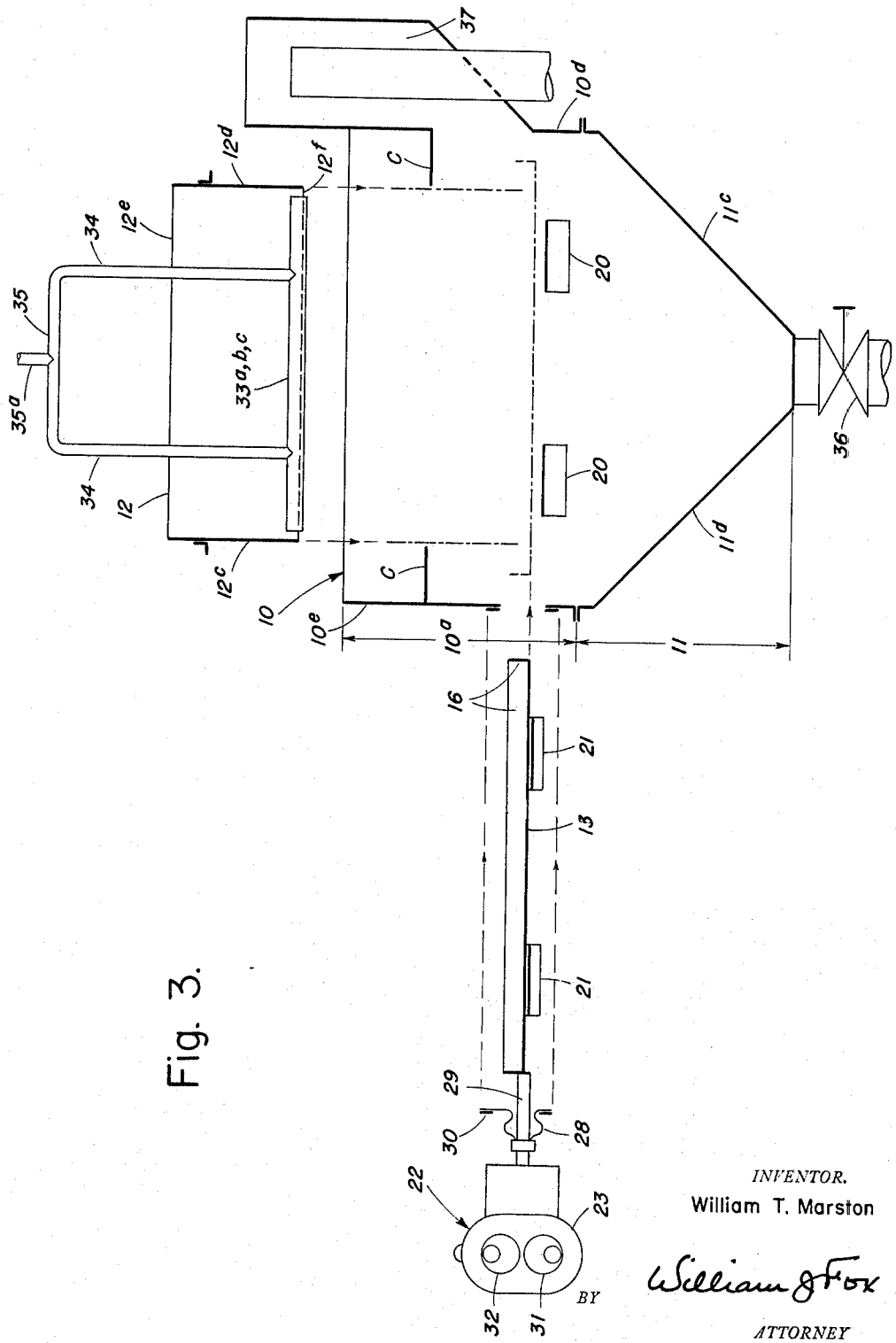

INVENTOR.
William T. Marston
BY William J Fox
ATTORNEY

Aug. 9, 1955     W. T. MARSTON     2,714,955
HYDRAULIC CLASSIFIER
Filed Dec. 9, 1953     12 Sheets-Sheet 6
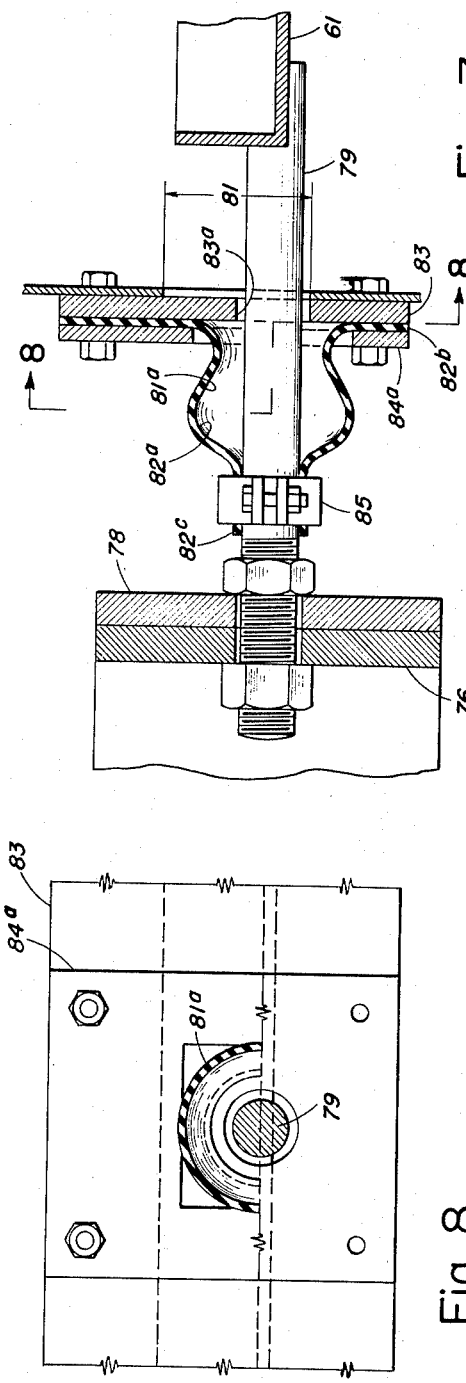
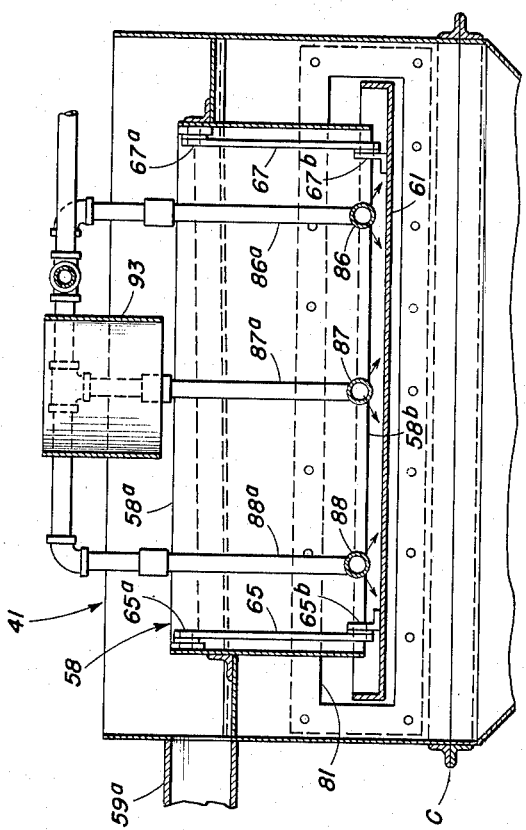
*INVENTOR.*
William T. Marston
BY *William J. Fox*
*ATTORNEY*

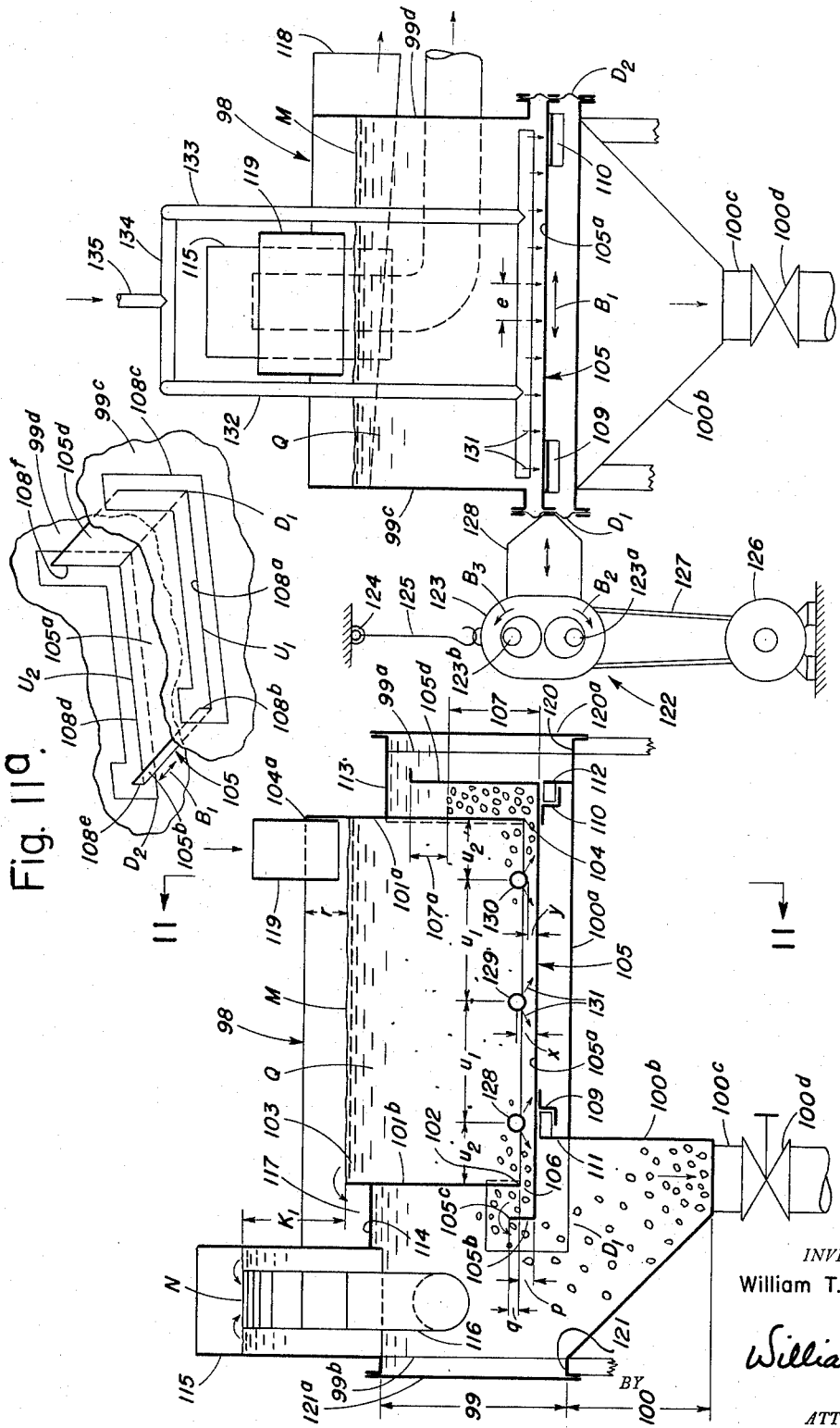

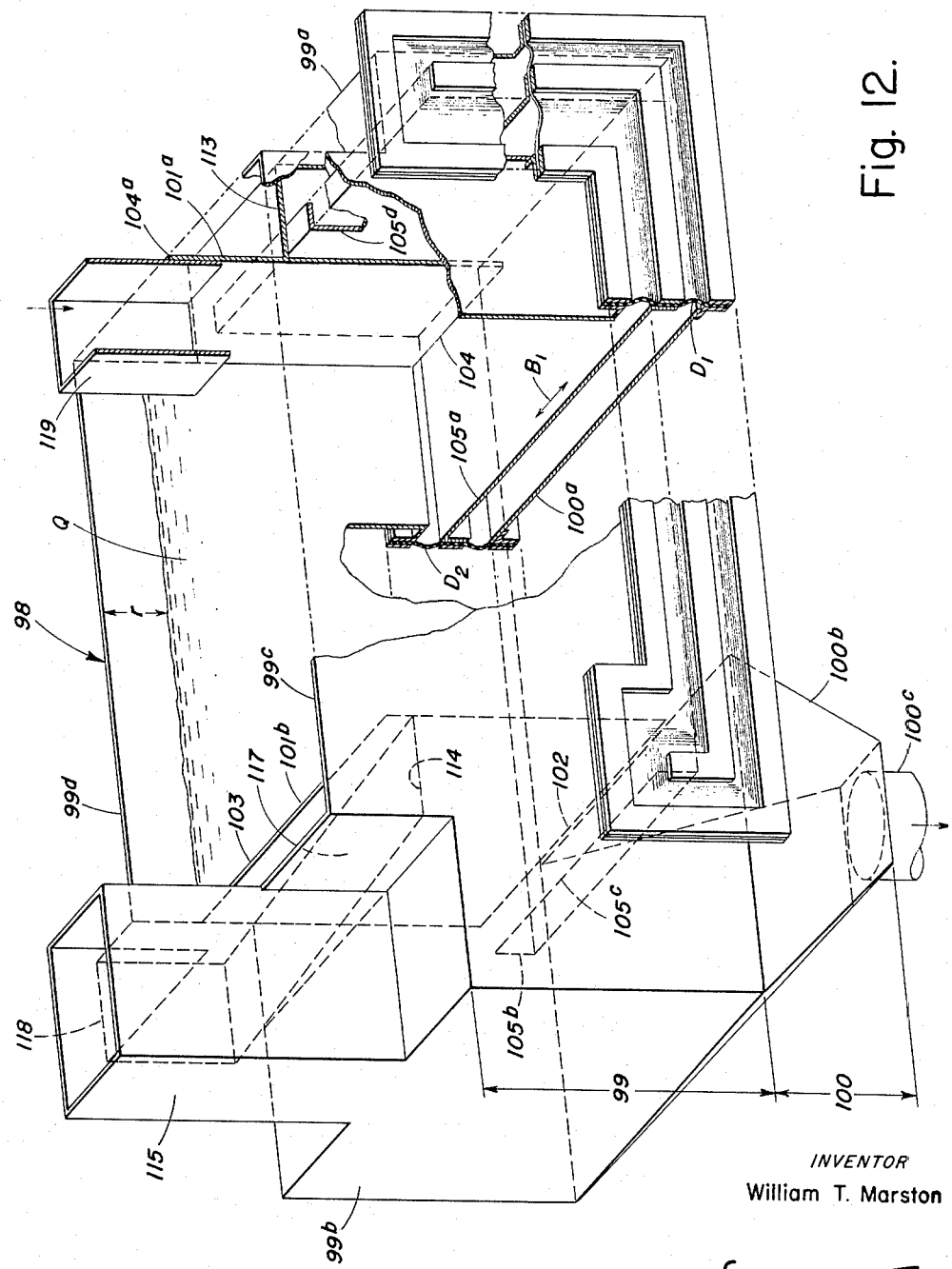

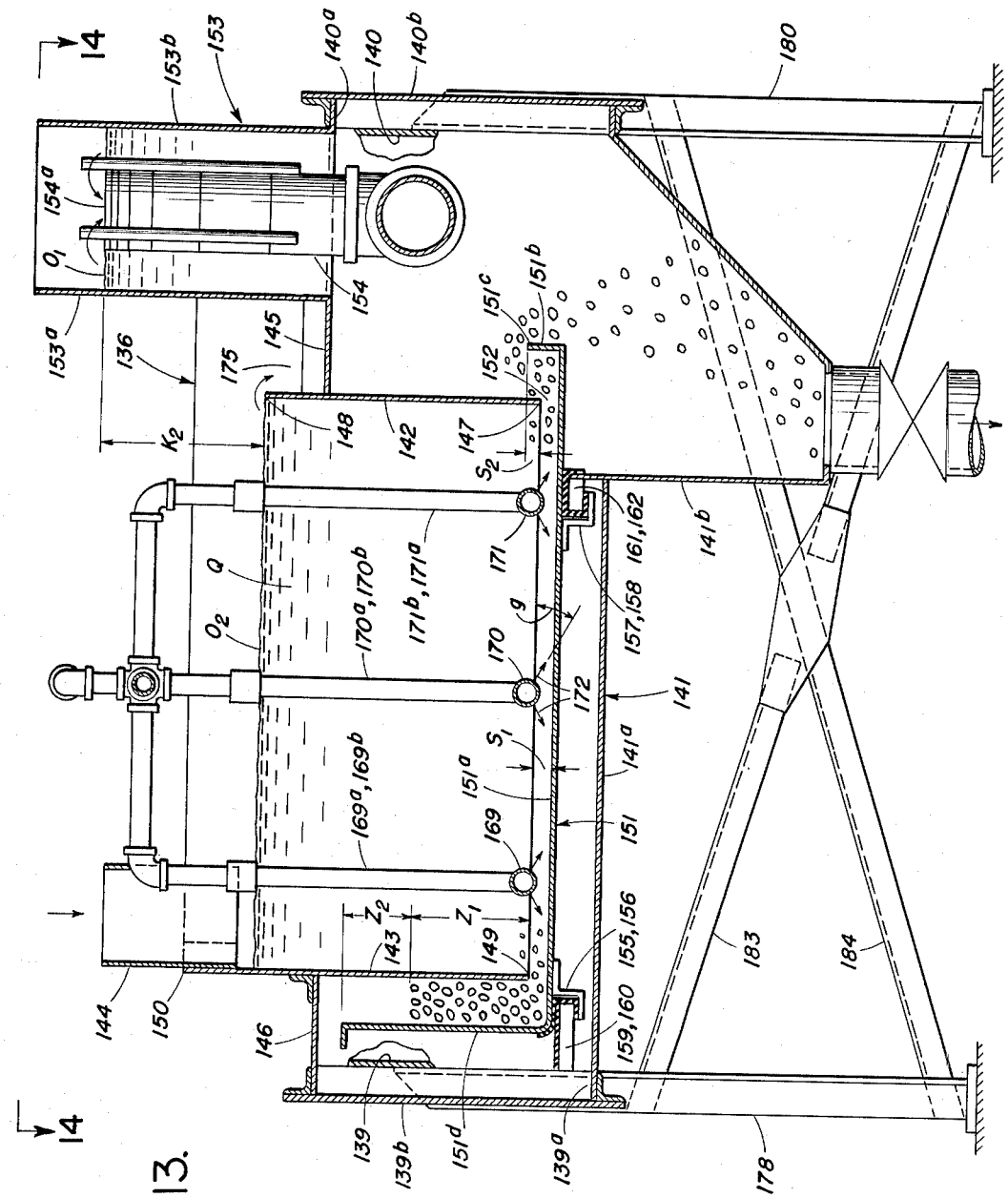

INVENTOR.
William T. Marston

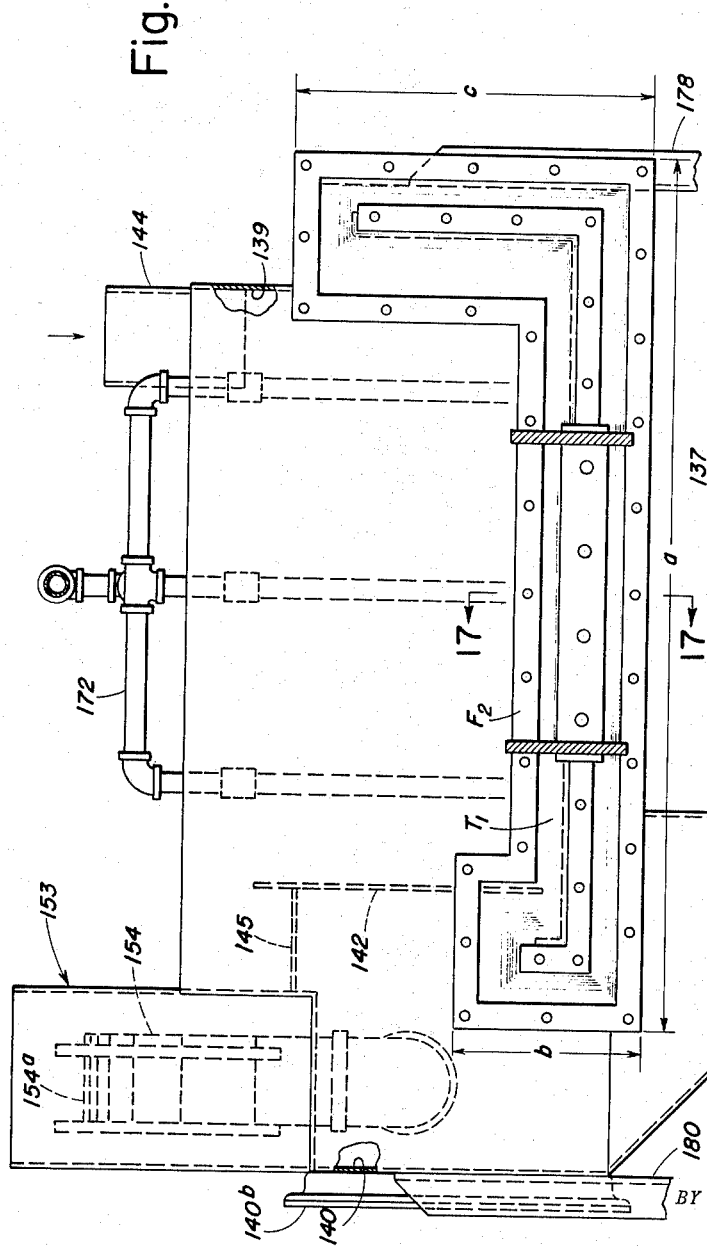
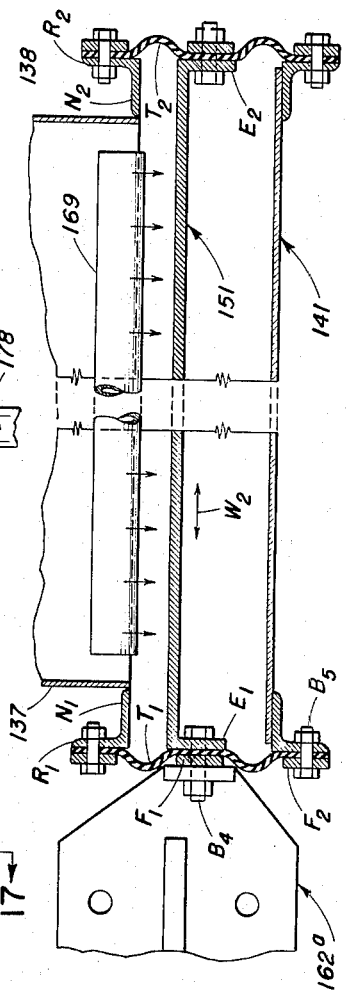

United States Patent Office 2,714,955
Patented Aug. 9, 1955

2,714,955

HYDRAULIC CLASSIFIER

William T. Marston, Denver, Colo., assignor to The Dorr Company, Stamford, Conn., a corporation of Delaware Application December 9, 1953, Serial No. 397,208

4 Claims. (Cl. 209—18)

This invention relates to the wet or hydraulic classification treatment of pulp containing a range of particle sizes from fine to coarse, as exemplified by metallurgical pulps or pulps of wet-ground ore, to effect the separation of the mixture of particles into a coarse and a fine fraction of sizes, these fractions herein to be simply termed the coarse fraction and the fines fraction, or else the oversize and the undersize. The coarse fraction then contains substantailly all sizes above an intermediate size while the fines fraction contains substantially all those that are smaller than the intermediate size.

Hydraulic separation such as herein contemplated takes place in a classification pool into which the pulp is fed, while the coarse fraction is withdrawn from the bottom of the pool and the fines fraction overflows from the pool across a weir. In order to aid and control the separation, the mixture of particle sizes while in transit through this pool may be kept mobilized by being subjected to the effect of controlled mechanical agitation, or subjected to the effect of a stream of auxiliary so-called hydraulic operating water up-flowing through the pool at a controlled velocity; however, as contemplated by this invention, the mixture in the pool is subjected to the joint effects of both mechanical and hydraulic action, with the result that a desired coarse fraction above a certain mesh size will collect at the bottom of the pool to be withdrawn therefrom, while a corresponding fraction of fine sizes with its carrier water overflows from the pool, this to afford superior means of separation control presently to be set forth.

It is among the basic problems in such wet classification-or separation treatment that there be effected as sharp a separation as possible between the oversize and the undersize or else between the underflow sizes and the overflow sizes; thus the aim is to conduct the classification treatment in such a manner or with such type of apparatus that each of the two fractions be obtained as free as possible from stray sizes of the other fraction.

Another basic problem in such wet classification treatment or apparatus is that of providing control means whereby the point of separation or fractionation or "cut" between the two groups of sizes, the oversize and the undersize can be readily established and accurately adjusted. For example, if the feed be of a run containing particle sizes ranging, say, from 28 to 200 mesh, then it should be possible, for example, to make a clean split at say, 100 mesh, yet it should be possible to readily shift the "cut" to, say, 48 mesh. This calls for providing simple and effective means for so adjusting or shifting the "cut" while deriving the respective size fractions clean, that is with a minimum of stray sizes admixed thereto. For example, the importance of producing a clean coarse fraction is apparent where the classification apparatus operates in closed circuit with a wet grinding mill, the mill to receive coarse fraction particles for regrinding, and where the admixture of an appreciable amount of undersize or stray sizes would burden the circulating load through the mill and would accordingly reduce its efficiency as well as that of the circuit as a whole.

Moreover, there is the general problem that such an apparatus should be capable of handling effectively a feed slurry containing a relatively wide range of particles of extreme sizes, that is, from relatively very fine to relatively very coarse.

Also there is to be considered in the operation of such classification treatment and apparatus the degree of dilution of the feed pulp, since it is desirable to produce a separation which remains substantially stable in spite of possible variations in the degree of feed dilution; another aspect lies in the fact that it may be desirable to derive the overflow of fines at the highest possible density, there being the difficulty that a high rate of hydraulic water required might run counter to the goal of attaining the desired degree of overflow density.

The invention provides improvements over the wet classification machine employing the joint or compound effect of mechanical and hydraulic classifying action shown in the patent to W. C. Weber, No. 2,302,588, which produces a sharp "cut" easily and accurately controllable, and which is operable with minimum of hydraulic operating water, capable of absorbing appreciable changes in the dilution of the feed pulp substantially without affecting the "cut" itself, even though capable of producing the overflowing undersize fraction at relatively great density, and of handling a feed pulp containing a wide range of particle sizes from fine to coarse.

It is among the objects of the present invention to produce a machine possessing at least the operational characteristics and capabilities of the machine in the aforementioned patent, yet to be simpler of construction, lighter in weight, cheaper to build, as well as simpler to maintain, simpler to overhaul and simpler to service, and last but not least, which is more compact and which lends itself to a variety of structural modifications whereby it is conveniently and compactly adaptable for structural integration in a treatment system such as closed-circuit grinding. The significance of these objects will appear more precisely from the following outline of the machine shown in that patent. In that machine, the pulp is fed to a significantly shallow pool the bottom of which is formed by a horizontal circular false bottom in the form of a perforated plate usually termed a constriction plate. A hydraulic supply chamber is associated with the under side of the constriction plate unitary therewith and has hydraulic operating water fed thereto continuously in order that such auxiliary water may continuously rise in the pool through and upwardly from the constriction plate at a controllable rate, thus helping to maintain the particles in the pool in a mobilized state. Moreover, this hydraulic chamber with its constriction plate is mounted for oscillatory movement about a vertical axis by means of a hollow vertical column rising from the center of the constriction plate and suspended from an overhead bearing structure which carries drive mechanism for imparting the oscillatory movement through the column to the constriction place and its associated hydraulic supply chamber. The slurry or pulp is fed to a central annular feed well surrounding the column, and under normal operating conditions the pulp in the pool is subjected to the joint effect of the oscillatory motion of the constriction plate and of the hydraulic water rising therethrough. A uniform distribution of hydraulic water over the entire bottom of the pool is thus obtained not only by reason of the fact that the water is being introduced by the great many holes in the constriction plate, but also because these holes are constantly being oscillated incident to the oscillatory motion of the constriction plate.

The classifier pool is furthermore defined by a cylindrical stationary boundary wall the top edge of which constitutes an overflow weir for discharging the undersize fraction of the pulp. This cylindrical boundary wall of the pool is concentric with the constriction plate although of a somewhat smaller diameter so that it is spaced slightly inwardly from the periphery of the constriction plate, yet also spaced upwardly from the marginal portion of the constriction plate. Thus, the constriction plate may oscillate beneath the stationary boundary wall, with the vertical distance between this wall and the constriction plate constituting an annular sands passage or solids transfer passageway leading outwardly from the pool bottom to allow for the outward migration and removal of the oversize fraction of the pulp from the pool. Importantly, along the periphery itself of the constriction plate there is provided what is herein termed a submerged sands discharge weir over which spill the sands or coarse fraction particles down into a receiving chamber which in turn surrounds the constriction plate. The sands discharge weir rises to a level at least somewhat higher than the sands passage, so that thereby there is maintained an annular sealing column of sands in transit between the passageway and the weir.

The annular space between the constriction plate and the surrounding receiving chamber is covered and closed by a top portion of the receiving chamber, which top portion in fact supports the cylindrical boundary wall of the pool by being rigidly connected therewith.

A body or column of clear water maintained in the sands receiving chamber defined by a clear water overflow weir of adjustable height balances the column of pulp or mobilized particles in the pool, and this balance represents a hydraulic equilibrium condition in the machine, whereby the separation or "cut" is readily controllable, namely, as by adjustment of the height of the clear water overflow weir.

The coarse fraction particles upon the oscillatory constriction plate will move or migrate outwardly, radially in all directions towards and through the sands discharge passage and over the submerged sands discharge weir which surrounds the passage, and into the surrounding sands receiving chamber whence they can be removed into emergence from a body of clear water as by any suitable conventional elevating means or the controlled spigot discharge means.

Thus, it is among the more specific objects of this invention to provide a machine which, while possessing at least the operating features and advantages of a machine such as above outlined, is simpler, lighter and cheaper of construction, with a substantial reduction of the oscillatory, or moving, masses, which is more compact and which is more readily and more compactly adaptable to environmental structural conditions, for example in what are known in metallurgical operations as closed-circuit grinding systems.

The objects of this invention are attained by a machine which is functionally similar to the one disclosed in the patent application of Harold B. Coulter, Serial No. 397,205 filed December 9, 1953 concurrently herewith, in that it provides a classifying pool where the feed pulp enters at a point spaced from the point of fines overflow discharge and from the point of sands underflow discharge. For example, the pulp may pass in a longitudinal direction from end to end through the pool undergoing classification, the underflow discharge being by way of a sands passage at the bottom of the pool and through a conecting sands column outside this passage. The desired kind of classification of the pulp in the pool is effected by the conjoint action of hydraulic water being introduced in substantially uniform distribution at the bottom of the pool and of horizontal longitudinal back-and-forth or vibratory movement of the bottom face of the pool. This movement is such as to provide sufficient acceleration and deceleration within its vibratory cycle, to continuously induce and maintain an intensified degree of relative movement between the bottom and the strata of oversize particles supported thereby. The "cut" between the two fractions is controllable by way of adjusting a static hydraulic counter-pressure effective at the sands discharge passage. One mode of so controlling the hydraulic counter-pressure is by way of a water column superimposed upon the sands column and defined by an adjustable clear water overflow at the super-elevation level. That is to say, the oversize particles from the sands column may be allowed to spill into a clear water chamber thence to be removed upwardly by suitable elevating mechanism, or to be removed downwardly by a suitably controlled spigot discharge valve. The fines fraction discharges by overflowing from the classifier pool.

In distinction from the apparatus of the aforementioned copending application, this invention provides a machine so organized that the classifier pool is contained in a stationary solid tank structure in which operates a vibratable bottom element mounted to perform horizontal longitudinal vibratory movement in the tank structure without the (use disclosed in the Coulter application) of certain flexible diaphragm means interconnecting certain stationary—with certain reciprocatory tank portions.

A vertical wall structure disposed above the vibratable bottom and in functional relationship therewith as well as rigidly connected to the surrounding walls of the tank, presents the confines of the classifier pool; the fines fraction overflows from the top of this wall structure while the coarse fraction solids or sands discharge from the bottom zone of the pool through a sands discharge passage between the stationary wall structure and the vibratory bottom below, and then across a sands discharge weir provided at and rising from the edge portion of the bottom plate, into a pocket or chamber which is formed by the surrounding tank structure. Importantly, a column of balancing liquid or water communicates with this chamber to provide controllable back pressure acting upon the coarse fraction at the sands discharge passage and thus in balancing relationship with the pulp column represented by the classifier pool. The balancing liquid thus surrounds the vibratory bottom plate as well as the associated wall structure which defines the classifier pool.

Horizontal vibratory movement of desired characteristics is imparted to the plate by means of a vibrating device operatively connected therewith and acting by way of a diaphragm provided in and upon the wall of the tank. Hydraulic operating water to act conjointly with the vibratory movement of the bottom plate is introduced to an overhead pipe system which extends into the bottom zone of the classifier pool for the purpose of emitting such operating water distributively over the area of the pool.

One embodiment provides for the vibratory bottom plate to be spaced from the surrounding tank wall along its entire periphery, so that coarse fraction solids may discharge across a peripheral weir into the water-filled collecting space or pocket below.

One feature in this embodiment provides that the classifier pool and the surrounding tank structure be substantially rectangular or square in plan view, with the fines fraction overflowing along the periphery of the pool and the coarse fraction discharging across a weir along the periphery of the bottom plate, and feed pulp being supplied centrally of the pool.

Another embodiment provides that both side edges of the vibratory bottom plate each be connected to a correspondingly shaped diaphragm mounted in the respective adjoining side wall portions of the tank. In this way the delivery of the coarse fraction solids from the classifier pool is confined to endwise discharge from the plate into the receiving chamber or pocket below.

Further particularized, this feature provides for the front wall and the rear wall of the classifier pool to be in the form of a pair of transverse partition walls solidly joined with the side walls of the tank structure, which latter wall thus constitutes the side walls of the classifier pool as well.

A feature in this embodiment provides that the fines fraction as well as the coarse fraction solids discharge from one end of the pool, that is, the fines from the top strata of the pool and the coarse solids from the bottom zone thereof. The fines are blocked by upwardly extending wall portions from overflowing except along the one end of the pool. The discharge of coarse solids is confined to one end portion of the plate by providing the other end portion of the plate with a vertical wall portion high enough to block the discharge of coarse fraction solids from that end into the adjoining body of balancing liquid that communicates with the aforementioned liquid overflow. It is an adjunct of this feature that the receiving pocket proper for the coarse fraction solids is disposed at and directly below the coarse solids discharge weir at one end of the pool, while the remainder of the plate is surrounded by the tank structure in a manner whereby that structure substantially follows the contour of the plate along the bottom and the rear, although spaced therefrom sufficiently to allow for hydraulic communication between the pocket and the top of a column of coarse fraction material building up in the space between the high rear vertical wall of the vibratory plate and associated rear wall of the classifier pool.

According to one feature common to both the above outlined embodiments, the vibratory plate is operatively suspended from the walls of the classifier pool by means of sets of parallel links disposed at the inner face of these walls and having their upper ends pivotally connected to these walls and their lower ends pivotally connected to the plate.

As this invention may be embodied in several forms without departing from the spirit or essential characteristics thereof, the present embodiment is therefore illustrative and not restrictive since the scope of the invention is defined by the appended claims rather than by the description preceding them and all changes that fall within the metes and bounds of the claims, or of forms that are their functional as well as conjointly cooperative equivalents, are therefore intended to be embraced by those claims.

Figure 1 is a diagrammatic vertical sectional view of one embodiment of the classifier apparatus.

Figure 2 is a vertical sectional view taken on line 2—2 of Figure 1.

Figure 3 is a vertical sectional view similar to Figure 2 although with parts drawn apart.

Figure 4:
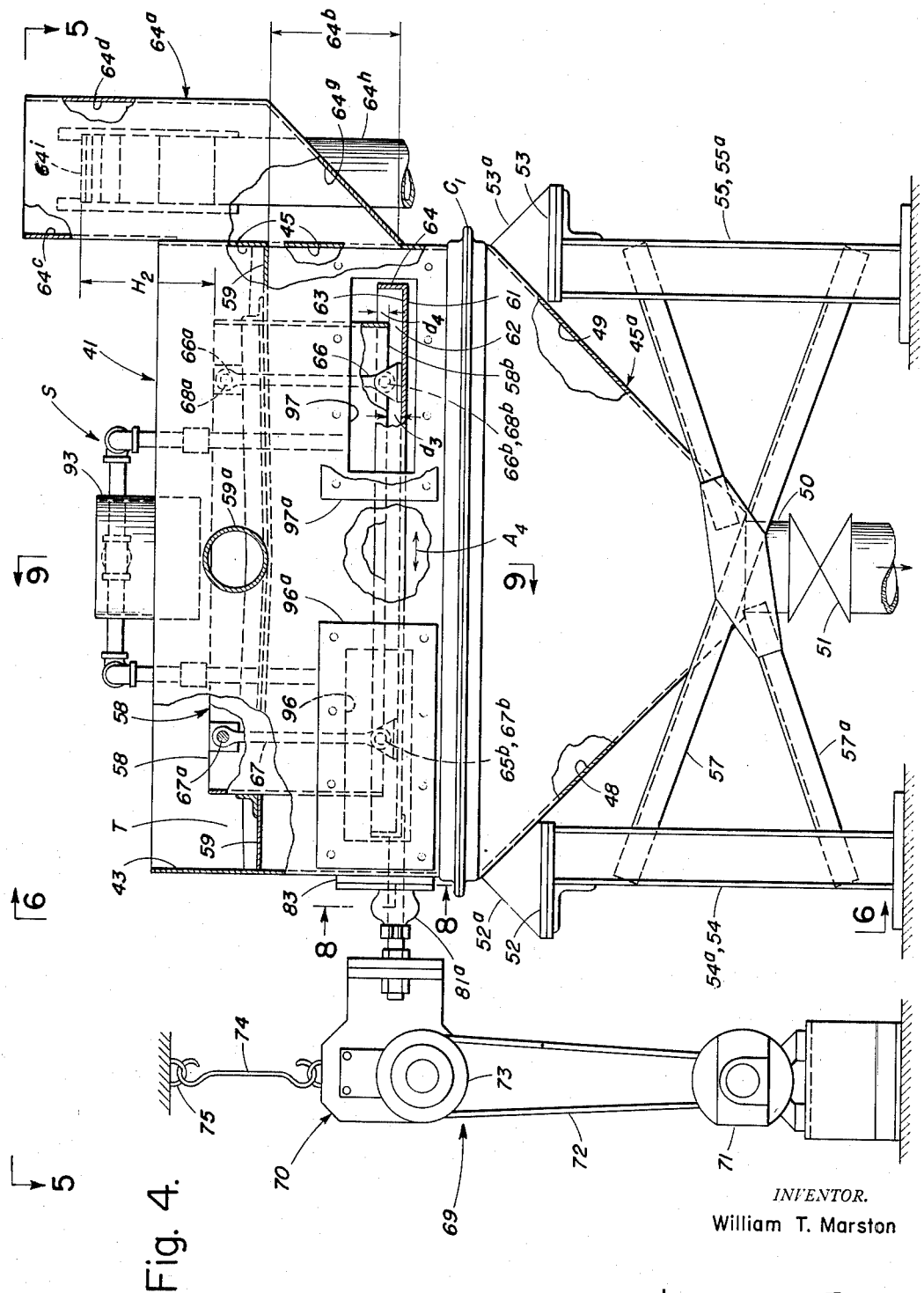
Figure 5:
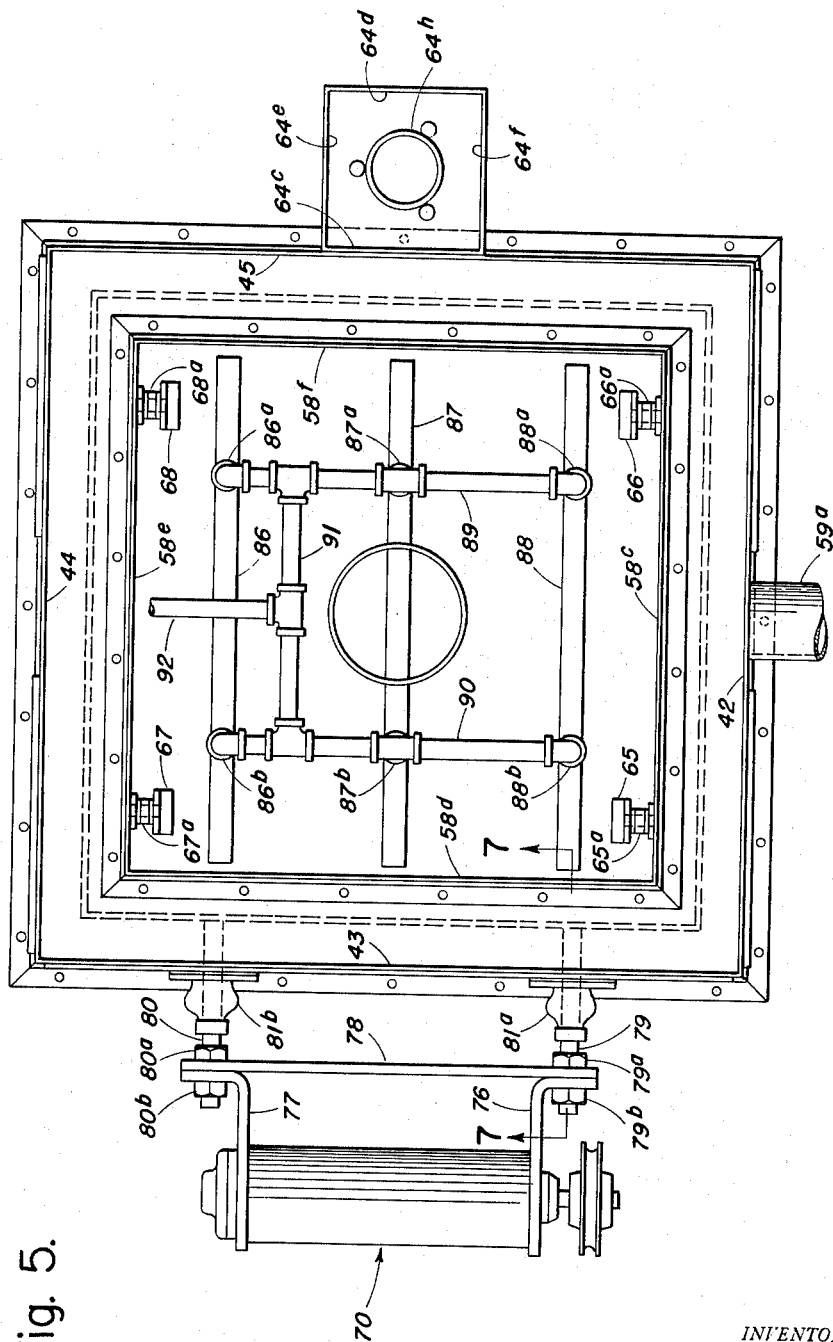
Figure 6:
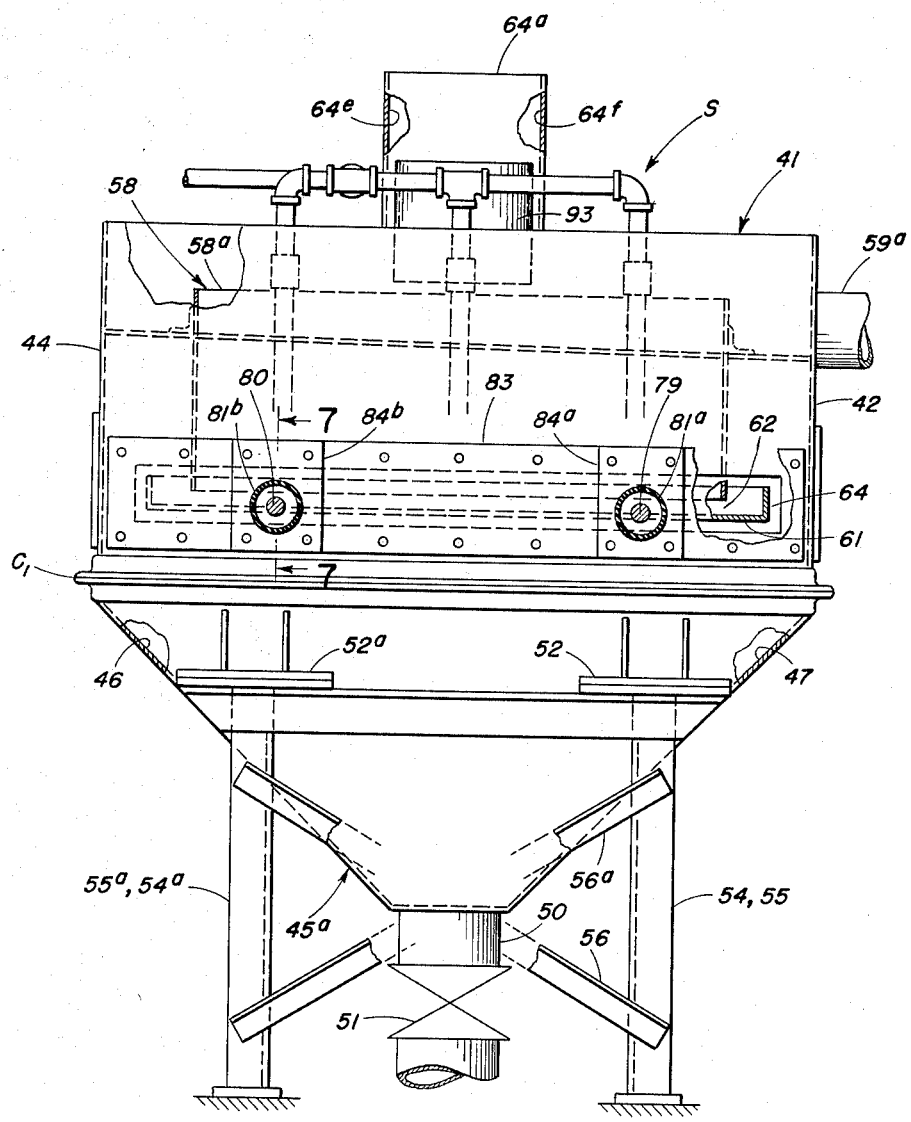

Figures 4 to 9 represent views of the Figure 1 to 3 embodiment, in greater structural detail; Figure 4 being a side view of the apparatus (corresponding to diagrammatic view of Fig. 2) with parts broken away; Figure 5 being a top view taken on line 5—5 of Figure 4; Figure 6 being a transverse sectional view taken on line 6—6 of Figure 4; Figure 7 being a longitudinal vertical detail section taken on line 7—7 of Figure 5; Figure 8 being a transverse detail section taken on line 8—8 of Figure 7; Figure 9 being a transverse sectional view taken on line 9—9 of Figure 4.

Figure 10 is a diagrammatic vertical sectional view of another embodiment of a classifier apparatus.

Figure 11 is a sectional view taken on line 11—11 of Figure 10.

Figure 11a is a diagrammatic perspective detail view of the vibratory bottom member of the Figure 10 and 11 embodiments of the classifier apparatus.

Figure 12 is a diagrammatic perspective view of the Fig. 10 embodiment of the apparatus.

Figure 14:
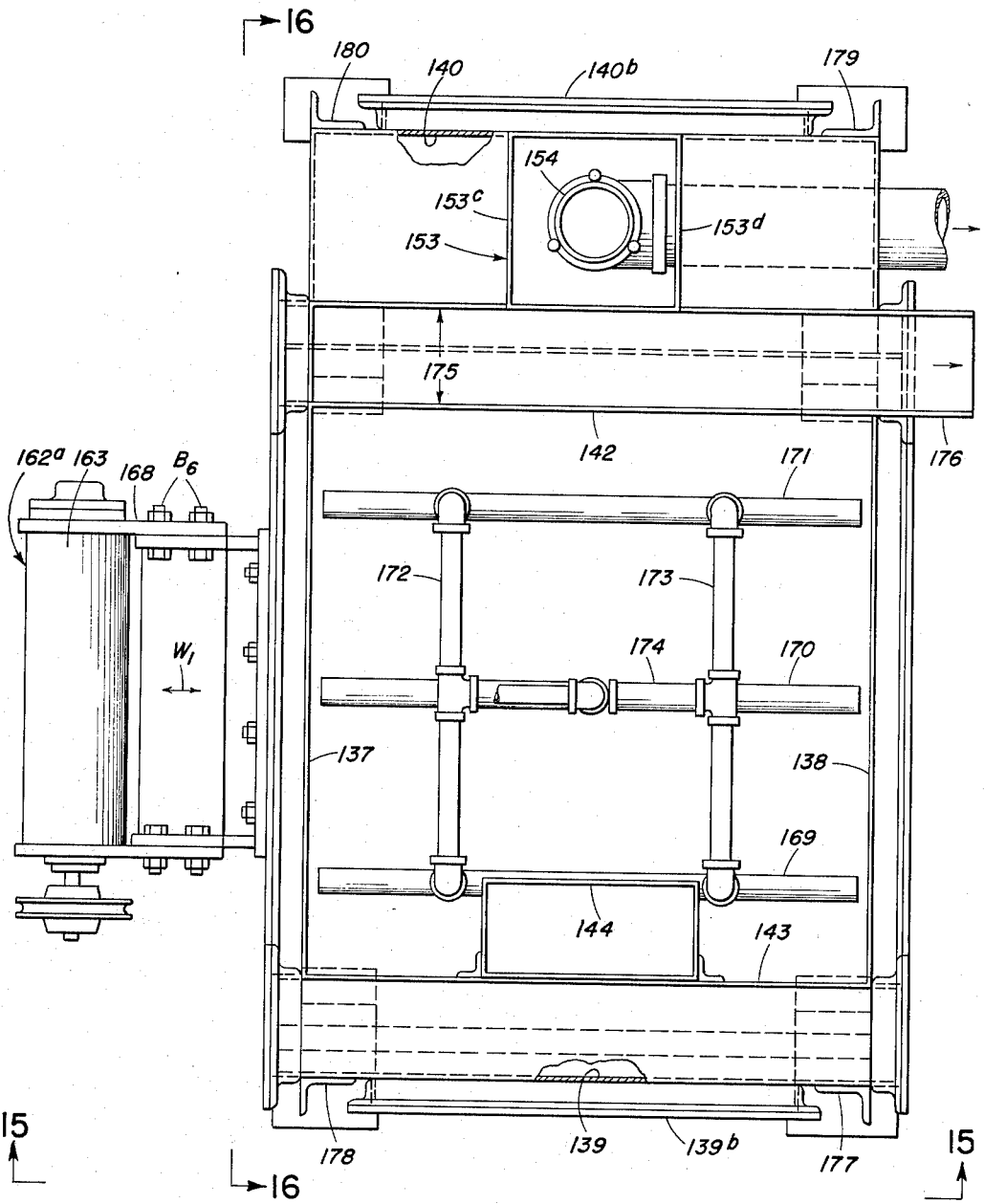
Figure 15:
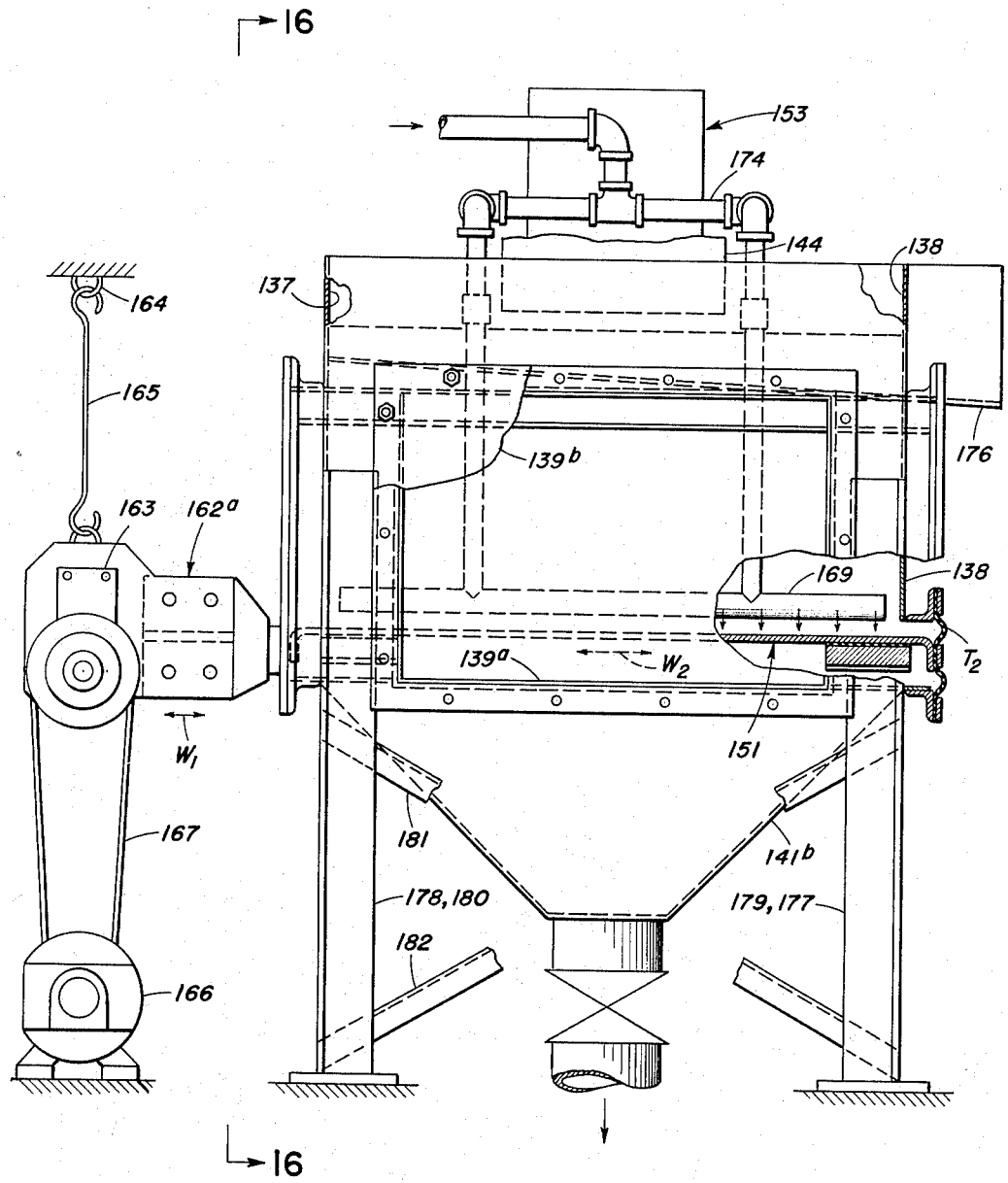

Figures 13 to 17 represent views of the Figs. 10 and 11 embodiment in greater structural detail; Fig. 13 being a longitudinal vertical sectional view (corresponding to the Fig. 1 diagrammatic view although end-wise reversed); Fig. 14 being a top view taken on line 14—14 of Fig. 13; Fig. 15 being an end view taken on line 15—15 of Fig. 14, with portions broken away; Fig. 16 being a transverse sectional view taken on lines 16—16 of Fig. 14; Fig. 17 being a vertical sectional view taken on line 17—17 of section 16.

Apparatus according to the embodiment of Figures 1 and 2 comprises a tank or tank structure 10 here shown to be square in plan view, which has a body portion 10a comprising vertical walls 10b and 10c in Figure 1 and the vertical walls 10d and 10e in Figure 2, which tank structure 10 further has an hopper shaped bottom portion 11 which in turn comprises the inclined walls 11a and 11b in Figure 1 and the inclined walls 11c and 11d in Figure 2.

Within the tank 10 there is rigidly supported a vertical wall structure 12 here also shown to be square in plan view, which wall structure is peripherally spaced from corresponding walls of tank 10, and it has vertical walls 12a and 12b in Figure 1 and 12c and 12d in Figure 2, this wall structure 12 thus provides an upper horizontal free edge 12e.

Cooperatively associated with the lower end or free edge 12f of the wall structure 12 is auxiliary horizontal bottom member 13 which is mounted to be horizontally vibratable in a plane spaced a distance "d" from the lower free edge 12f of wall structure 12, so the wall structure 12 and the bottom member 13 together provide the space containing and defining the classifier pool P. The wall structure 12 is rigidly connected with the surrounding walls of tank 10 by means of a cover member or plate "C" which plate extends within the space between the wall structure 12 and the surrounding wall of tank 10.

The vibratory bottom member 13 being spaced the distance "d" from the bottom of wall structure 12 thus forms therewith a peripherally extending passage 14 for the coarse fraction material 15 to pass therethrough from the bottom zone of the classifier pool P. The bottom member 13 has a peripherally extending weir 16 here termed the submerged sands discharge weir which is slightly higher than the passage 14 so that the coarse fraction material in transit from the passage 14 to the weir 16 is adapted to constitute a fluid seal even though that material traverses across the weir 16 into the body of water that fills the space surrounding the classifier pool P.

The fines fraction overflows from the top zone of the classifier pool at a level $L_1$ across the peripheral overflow edge into a surrounding receiving launder 18 formed by the top end portion of wall structure 12, by the cover plate member "C," and by the top end portion of the tank structure 10, and being provided with an outlet 19 for the fines fraction to discharge from the receiving launder 18.

The bottom plate member 13 is mounted to perform horizontal substantially rectilinear reciprocatory or vibratory movement, such mounting here being indicated by way of example by a pair of guide members 20 at each side of the bottom member and fastened upon and extending inwardly from the wall of tank structure 10. These stationary guide members 20 extend into operative engagement with complementary groove forming members 21 fastened to the underside of the bottom member 13 and having sliding relationship with the stationary guide members 20 when the bottom 13 is being reciprocated.

For actuating the bottom member 13 there is provided a vibrating device 22 comprising a vibrator unit 23 proper shown to be suspended as by means of a swingable member 24 depending from an anchoring point 25, the vibrator unit 23 being driven by a stationary motor 26 through an endless power transmitting member or belt 27. The vibrator unit 23 is operatively connected with the bottom member 13 through a stem 28 which stem extends through a diaphragm member 29 in sealing relationship therewith, which diaphragm member is provided upon and in effect constitutes a part of the tank wall 10e and is fastened thereto as at 30. The vibratory unit 23 functions by reason of the rotation of a pair of shafts 31 and 32 contained in this unit, which shafts are eccentrically weighted in such a manner as to impart to the bottom member 13 horizontal vibratory forces indicated by double-headed arrow $A_1$.

Hydraulic operating water is distributively introduced into the bottom zone of the classifier pool by means of a set of stationary horizontal pipes here shown to comprise the pipes 33, $33^a$ and $33^b$, spaced a suitable distance "$d_1$" from the bottom 13, each horizontal pipe having along each side thereof a row of orifices so disposed as to emit jets 34 of operating water, these jets being directed towards the bottom at a suitable angle "$w$" below the horizontal. The spacing "$Z_1$" of the pipes 33, $33^a$ and $33^b$ from one another and the spacing "$Z_2$" of pipes $33^a$ and $33^b$ from the walls of the classifier pool, the spacing "$d_1$" of the pipes from the bottom 13, the spacing "$Z_3$" of the jet emitting orifices and their direction (angle "W") relative to the bottom, all are so chosen and so correlated to one another that there is obtained in the pool what is in effect a flow of operating water rising from the bottom in substantially uniform distribution across the area thereof. The jet emitting pipes 33, $33^a$ and $33^b$ have vertical feeder pipes $34^a$ supplied from a header 35 having a supply pipe $35^a$ provided with control valve means (not shown).

The bottom portion of tank structure 10 has controllable discharge means indicated by a control valve 36 for discharging therethrough the coarse fraction material at a suitable controlled rate. Control of the "cut" between the two size fractions, the fines overflow and the coarse underflow, is here shown by way of example to be effected by providing the tank 10 with a hydraulic column 37 provided with an overflow pipe 38 comprising removable rings 39 whereby the overflow level $L_2$ of hydraulic column 37 is rendered adjustable. In this way, by allowing the relatively clear water to overflow at level $L_2$ from tank 10, there is established a superelevation $H_1$ of level $L_2$, that is to say, the clear water overflow from column 37 is spaced a distance $H_1$ above the overflow at level $L_1$ of the fines fraction from the classifier pool. Otherwise expressed, the superelevation $H_1$ is the differential between the height $H_2$ and the height $H_3$ of the pulp column in the classifier or as measured from the free bottom edge $12^f$ of the passage 14 at the bottom zone of the pool. The feed of pulp or slurry to the pool is indicated by a feed chute 40 or the like.

Even though this embodiment shows the shape of the tank 10 and of the wall structure 11 to be square in plan view, it is to be understood that other than a square or rectangular shape would fall within the bounds of this invention; for example, if the shape be round, the length of the jet emitting pipes would be suited accordingly, and so would the means for movably supporting the vibrator bottom for instance by the use of suspension links such as shown and described in the structural embodiments further below.

In its structurally more fully executed form (Figs. 4 to 9) the Fig. 1 embodiment comprises a classifier tank 41 shown to be square in plan view. This tank has a body portion comprising vertical walls 42, 43, 44, 45, and has a hopper-shaped bottom or sands-receiving pocket $45^a$ defined by inclined walls 46, 47 (see Fig. 6) and inclined walls 48 and 49 (see Fig. 4). The bottom portion or pocket $45^a$ has at its lower end or vortex a sands discharge neck 50 provided with discharge regulating means indicated by a valve 51 for controlling the rate of discharge of coarse fraction material from this pocket. The upper or body portion of the tank is connected to the bottom portion or pocket $45^a$ as by a flange connection "$C_1$". The tank 41 is provided with a pair of pads or brackets 52 and $52^a$ at one side and a pair of brackets 53 and $53^a$ at the opposite side, by means of which brackets the tank rests upon and is fastened to a supporting structure or frame comprising a pair of corner posts 54 and $54^a$ at one side and a pair of corner posts 55 and $55^a$ at the opposite side, with the addition of bracing means between the posts as indicated by diagonals 56 and $56^a$ in Fig. 6 and diagonals 57 and $57^a$ in Fig. 4.

Within this tank 41 and in rigid relationship therewith there is provided an internal wall structure 58 also shown to be square in plan view and having a free top edge $58^a$ and a free bottom edge $58^b$, comprising four side walls $58^c$, $58^d$, $58^e$, $58^f$. This internal wall structure 58 represents the vertical peripheral confines of the classifier pool; a cover-or top plate means 59 rigidly interconnects the wall structure 58 peripherally with the surrounding walls of the tank 41, so that the upper end portions of the tank 41 and of the internal wall structure 58 constitute with the cover plate means 59 a receiving trough "T" surrounding the upper end of internal wall structure 58, so that the fines fraction from the top zone of the classifier pool may overflow across the peripheral weir presented by the top edge $58^a$ of wall structure 58, and pass from the trough through a discharge pipe indicated at $59^a$.

The bottom of the classifier pool itself is defined by a horizontal bottom plate member 61 mounted in such a manner as to be spaced a distance from $d_3$ from the bottom edge $58^b$ of wall structure 58, whereby there is formed peripherally along the bottom of the classifier pool a sands discharge passage 62.

The bottom plate member 61 is substantially in the form of a flat tray member which along its periphery extends outwardly beyond the wall structure 58 so as to form what may be called a peripheral shelf 63 having along the outer edge thereof what is herein termed a submerged sands discharge weir 64 rising to a point or elevation slightly higher by a differential $d_4$ than the height $d_3$ of the sands discharge passage 62. In this way, the coarse fraction solids migrating from the bottom zone of the pool through the passage 62 towards the weir 64 will fill the shelf space between the passage and the weir and will spill across the weir into the receiving pocket $45^a$ of tank 41.

The tank 41 has laterally disposed thereof and communicating therewith an extension chamber $64^a$ communicating at the bottom thereof with the interior of tank 41 as through an opening $64^b$, that is to say, this extension chamber $64^a$ has an inner end wall $64^c$, an outer end wall $64^d$, a pair of side walls $64^e$ and $64^f$, and a sloping bottom $64^g$. Within this extension chamber $64^a$ there is provided an overflow pipe $64^h$ presenting an adjustable overflow level $64^i$ for a water column thus maintained in the extension chamber $64^a$ at an adjustable level to provide a superelevation $H_2$ above the top edge $58^a$ which constitutes the peripherally extending fines fraction overflow of wall structure 58.

The bottom plate 61 is mounted to perform reciprocating or vibratory movement as indicated by the double arrow $A_4$. That is to say, at each of two opposite sides the plate member 61 is operatively suspended from the respective adjacent wall portions of the internal wall structure 58 as by a pair of vertical parallel links, namely a pair of links 65 and 66 operatively connecting one side portion of the bottom plate 61 with wall $58^c$, and a pair of parallel links 67 and 68 operatively connecting the opposite side portion of bottom plate 61 with the opposite wall $58^e$ of wall structure 58. The pair of links 65 and 66 operatively supports the one side portion of plate 61 in that the link 65 has an upper end pivotal connection $65^a$ with wall $58^c$ at the inner face thereof, and has a lower end pivotal connection $65^b$ with the corresponding side portion of bottom plate 61, while the associated parallel link 66 has a similar upper end pivotal connection $66^a$ with wall $58^c$ and a lower end pivotal connection $66^b$ with the bottom plate 61; similarly the other pair of links 67 and 68 operatively supports the opposite side of the bottom plate 61, in that the link 67 has an upper end pivotal connection $67^a$ with wall $58^e$ and has a lower end pivotal connection $67^b$ with the corresponding side portion with the bottom plate 61, while the associated parallel link 68 has an upper end pivotal connection $68^a$ with the wall $58^e$ and has a lower end pivotal connection $68^b$ with the corresponding side portion of bottom plate 61.

Reciprocatory or vibratory motion in a horizontal direction is imparted to the bottom plate 61 member by means of a vibrating device 69 comprising a vibrating unit 70 proper and a motor 71 for driving the same to set up oscillatory mechanical impulses; the motor drives the vibrating unit through an endless transmitting element or belt 72 engaging upon a drive pulley 73 of the vibrating unit.

The vibrating unit 70 is movably supported as by a hanger element 74 having stationary anchoring means 75. As here shown, the vibrating unit 70 has a pair of end plates 76 and 77 and a bracket plate 78 interconnecting the end plates by means of a pair of threaded stems 79 and 80 extending horizontally parallel to each other, each of these stems being rigidly connected to the vibrating unit by a pair of lock nuts, the stems 79 having lock nuts $79^a$ and $79^b$ the stem 80 having lock nuts $80^a$ and $80^b$. Both of the stems 79 and 80 extend through a common horizontally elongated opening 81 in tank wall 43, and have rigid connections with the bottom plate member 61 so that when in operation the vibrating unit 70 and the bottom plate 61 constitute a reciprocatory or vibratory body or mass. Sealing relationship between the tank wall 43 and the stems 79 and 80 is effected by way of diaphragm means provided between each stem and the tank wall 43. The diaphragm means for the stems 79 and 80 comprise identical diaphragm members $81^a$ and $81^b$ respectively. Referring to diaphragm member $81^a$ that member comprises a substantially bulbous body portion $82^a$, a wide flange portion $82^b$ at its inner end and a narrow tubular portion $82^c$ at its outer end. The wide flange portion $82^b$ is shown to be confined between a plate member 83 and a hold-down flange or plate, there being provided a hold-down plate $84^a$ for diaphragm $81^a$ and hold-down plate $84^b$ for diaphragm $81^b$. The plate member 83, in fact, constitutes a removable cover plate for the opening 81 in tank wall 43 which cover plate has a pair of openings $83^a$ and $83^b$ (the latter not visible in the drawing) through which openings extend the stems 79 and 80 respectively. The cover plate member 83 thus provides a common mounting or base for the diaphragms $82^a$ and $82^b$. The narrow tubular portion $83^c$ of the diaphragm member 82 hugs its respective stem 79 and is sealingly secured thereto as by a clamp 85.

Means are provided for distributively introducing hydraulic operating water through a stationary pipe system "S" which comprises horizontally extending jet emitting parallel pipes disposed in the bottom zone of the classifier pool, being spaced a suitable distance upwardly from the bottom plate member 61. This stationary jet-emitting pipe system "S" functionally corresponds to the one shown in the Figure 1 embodiment, and comprises a set of three jet emitting horizontal pipes 86, 87, 88 parallel to one another. Each of these horizontal pipes is shown to have a pair of vertical feeder pipes, the horizontal pipe 86 having a pair of vertical feeder pipes $86^a$ and $86^b$, the horizontal pipe 87 having a pair of vertical feeder pipes $87^a$ and $87^b$, the horizontal pipe 88 having a pair of vertical feeder pipes $88^a$ and $88^b$. The row of vertical feeder pipes $86^a$, $87^a$ and $88^a$ is connected to and supplied by a horizontal sub-header 89, and the row of vertical feeder pipes $86^b$, $87^b$, $88^b$ is connected to and supplied by a horizontal sub-header 90. The sub-headers 89 and 90 in turn are connected to and supplied by a main header 91 which has a supply pipe 92 provided with a control valve not shown.

The stationary pipe system "S" for supplying the operating water is mounted upon the tank 41 in such a manner as to render adjustable the distance "V" between the jet emitting pipes and the bottom plate member 61, and also in a manner to allow the pipe system "S" to be bodily lifted from the tank (see Fig. 3).

The supply to the classifier pool of slurry to be classified is indicated by a supply chute or spout 93, the discharge of fine fraction material is through the delivery spout $59^a$ leading from the peripheral receiving trough T, while the bottom discharge pipe 50 with its regulating valve 51 provides for the delivery of the coarse fraction material at a controlled rate. The overflow pipe $64^h$ allows for the discharge of relatively clear water, herein also termed the clear water overflow serving to establish and to maintain a superelevation $H_2$ balancing the slurry column of the pool so as to establish that degree of density in the pool that is required for producing a desired size separation or "cut."

A pair of inspection openings 96 and 97 are provided in each of the tank walls 42 and 44, which openings have detachably and sealingly fastened thereto a cover plate $96^a$ and $97^a$ respectively.

After lifting the pipe system "S" from tank 41 and after disconnecting the suspension links 65, 66 and 67, 68, and after loosening the cover plate member 83 from tank wall 43, one may withdraw the bottom plate member 61 laterally from the tank by way of the opening 81 therein (see Fig. 3).

The classifier apparatus in the embodiment of Figures 10, 11, 12 comprises a tank or tank structure 98 which has a body portion 99 rectangular in plan view having an end wall $99^a$ at the feed end of the tank, end wall $99^b$ at the discharge end of the tank, side walls $99^c$ and $99^d$, the tank further having a bottom portion 100. The tank 98 has a pair of transverse partition walls $101^a$ near the feed end of the tank and $101^b$ near the discharge end of the tank, these partition walls rigidly interconnecting the side walls $99^c$ and $99^d$ of the tank; in this way the partitions $101^a$ and $101^b$ together with the side walls $99^c$ and $99^d$ constitute the vertical peripheral confines of the space that holds the classifier pool "Q." The partition wall $101^b$ has a free horizontal lower edge 102 and a free horizontal top edge 103 the latter presenting an overflow edge or weir through which the fines fraction may discharge from the top zone of the classifier pool "Q." The partition wall $101^a$ has a free bottom edge 104 and it has a top edge $104^a$ which extends to a point a distance "$r$" above the top level M from the pool "Q" and thus to the same height as that of the side walls $99^c$ and $99^d$ of tank 98.

The classifier pool "Q" is further defined by an auxiliary bottom member 105 disposed a distance "$p$" below the lower free edges 102 and 104 of the partition walls $101^a$ and $101^b$ respectively, the bottom member 105 thereby forming with the lower edge 102 a sands discharge passage 106 through which migrates coarse fraction material from the bottom zone of the classifier pool "Q." The auxiliary bottom member 105 comprises a flat horizontal portion $105^a$, a low vertical end portion or weir $105^b$ at the sands discharge end with a horizontal top edge $105^c$ representing a submerged sands discharge weir edge across which the coarse fraction material may spill into the bottom portion 100 of tank 98. The discharge weir $105^b$ rises to a level slightly higher by the differential "$q$" than the sands discharge passage 106, so that coarse fraction material migrating through the sands passage 106 will fill the space between that passage and the weir $105^b$ to spill across the weir edge $105^c$ into the bottom portion 100 of the tank. At its opposite—or feed end the bottom member 105 comprises a high wall portion $105^d$ providing between it and the transverse partition wall 104 a space occupied by hydraulic sealing column 107 containing coarse fraction material overlain by a column of substantially clear water $107^a$.

With respect to the auxiliary bottom member 105 and referring more particularly to the diagrammatic detail of Fig. $11^a$, that bottom member is further defined by a pair of U-shaped edge portions $U_1$ and $U_2$; the edge portion $U_1$ comprising a horizontal intermediate edge portion $108^a$, a low upright end portion $108^b$ and a high upright end portion $108^c$; the opposite edge portion $U_2$ similarly comprising a horizontal intermediate edge portion $108^d$ a low upright end portion $108^e$ and a high upright end portion 108$^f$. The U-shaped edge U$_1$ is sealingly fastened to a corresponding U-shaped diaphragm member D$_1$ which in effect constitutes a portion of the tank wall 99$^c$; similarly, the edge portion U$_2$ is sealingly fastened to a correspondingly U-shaped diaphragm member D$_2$ which in effect constitutes a portion of tank wall 99$^d$. By virtue of being thus edge-wise connected with the diaphragms D$_1$ and D$_2$ the bottom member 105 is capable of being reciprocated or vibrated in a horizontal direction transversely of the tank although in sealing relationship with the tank walls 99$^c$ and 99$^d$. The transverse horizontal directions of this reciprocating movement is here indicated by the double headed arrow B$_1$, and it is transversely of the general direction of migration or flow of material from the feed end to the discharge end of the tank.

In order that the vibrating or reciprocating movement of the bottom member 105 be properly and positively guided there are provided at each side of the bottom member a pair of grooved members 109 and 110 fixed upon the underside of the bottom member; also there are correspondingly provided pairs of stationary guide members 111 and 112 fixed upon the bottom of tank 98 and closely engaged with respective grooved members 109 and 110 so as to have sliding engagement therewith when the bottom member 105 reciprocates.

The solid tank bottom portion 100 more in detail comprises a substantially horizontal portion 100$^a$ extending underneath and substantially co-extensive with the bottom plate 105 and a pocket portion 100$^b$ for receiving coarse fraction material spilling across the submerged weir edge 105$^c$. Discharge of coarse fraction material from the bottom of the receiving pocket 100$^b$ is through a discharge pipe 100$^c$ having a discharge control means indicated by valve 100$^d$.

The tank 98 has a top cover plate 113 at the feed end and another top cover plate 114 at the discharge end. A stack-like extension or chamber 115 rises from the cover plate 114 at the discharge end to provide a liquid column herein termed the clear water column which has a height or top level "N" as defined by the top overflow edge of overflow pipe 116. The overflow level N of pipe 116 is spaced upwardly a distance from the pulp overflow level M of the classifier pool, which distance is herein defined and referred to as the superelevation "K$_1$." Between the fines overflow edge 103 of the pool and the extension 115 there is formed a receiving trough 117 into which passes across edge 103 the overflowing fines fraction from the top zone of the pool, there being shown a discharge spout 118 delivering the fines fraction from one end of the receiving trough 117. Feed slurry entering the classifier pool is indicated by a feed chute or pipe 119.

A large inspection opening 120 is provided in endwall 99$^a$ at the feed end of the tank, which opening is closed by a removable vertical cover plate 120$^a$; similarly, an inspection opening 121 is provided in end wall 99$^b$, closed by a removable vertical cover plate 121$^a$.

The reciprocating or vibrating movement indicated by a double headed arrow B$_1$ is imparted to the bottom member 105 by a vibrating device 122 comprising a vibrating unit 123 moveably suspended from an anchoring point 124 as by a hanger member 125; the vibrating device further comprises a motor 126 for driving or actuating the vibrating unit 123, through an endless transmitting member or belt 127. The vibrating unit 123 is rigidly connected with the bottom plate 125 through diaphragm D$_1$, whereby both the vibrating unit 123 and the bottom plate member 105 constitute a vibratory body or mass.

The vibrating device 123 is here indicated to comprise a pair of eccentrically weighted shafts 123$^a$ and 123$^b$ geared up with one another to rotate in opposite directions as indicated by arrow B$_2$ and B$_3$, one of them being driven by motor 126. Such rotation of the eccentrically weighted shafts 123$^a$ and 123$^b$ imparts free horizontal reciprocating force components to the vibrating unit 123 and therewith to the bottom plate member 105 for effecting the desired reciprocating motion thereof.

Hydraulic operating water is introduced distributively into the bottom zone of the classifier pool "Q" by means of a set of horizontal parallel jet-emitting pipes 128, 129, 130 spaced from the bottom plate a distance "y," the jet emitting pipes themselves being spaced from one another a suitable distance "$u_1$" the pipes 128 and 130 being spaced a distance "$u_2$" from the respective transverse partition walls 101$^a$ and 101$^b$ respectively, the distance "$u_2$" being substantially one-half of the distance "$u_1$". Jets 131 of hydraulic operating water issuing from each of these pipes are spaced a distance "$e$" from one another, and they are emitted from each of the horizontal pipes laterally in both directions towards the bottom although under a suitable angle "$x$" below the horizontal, each such jet issuing from a suitable orifice in the pipe. Each of the horizontal jet emitting pipes has a pair of parallel vertical feeder pipes indicated at 132 and 133 which in turn have a supply header indicated at 134 and provided with a supply pipe 135 having a regulating means for control valve here not shown.

Fig. 12 is a diagrammatic perspective view of the Fig. 10, 11 and 11$^a$ embodiment of the apparatus which perspective view illustrates the general organization of the apparatus although, for simplicity's sake, omitting the vibratory device as well as respective openings at the ends of the tank and also omitting the clear water overflow pipe, but otherwise bearing the same numerals as the Figs. 10, 11, 11$^a$, to designate corresponding parts.

While there has been shown and described a manner of controlling the density of the classifier pool by way of establishing the superelevation (as defined by the overflow level in the sands receiving chamber), such control may be effected in other suitable ways, for example by way of measuring or obtaining indications of the density of the classifier pool, and employing them as criteria for adjusting and controlling the rate of a spigot valve discharge of coarse fraction material from the bottom of the receiving chamber itself. Such manner of control requires eliminating the overflow means from the receiving chamber and it operates to throttle down the coarse fraction discharge means to a suitable extent when the density of the pool decreases to below a desired value and to unthrottle the coarse fraction discharge means to a suitable extent when the density increases to above the desired value.

Automatic means may be provided for effecting such control by applying fluctuations or changes occurring in the density of the pool through suitable relay action in a manner to control the rate of discharge of coarse fraction material from the receiving chamber thus correctively maintaining the desired density in the pool. Such control is to function in the sense that an increase of density in the pool automatically effects a suitable increase in the rate of coarse fraction discharge, whereas a decrease of density automatically effects a suitable decrease in the rate of coarse fraction discharge. That is to say, density variations in the pool manifest themselves by the fluctuations of a hydraulic column communicating with the pool, which fluctuations are relays through suitable instrumentation to actuate the coarse fraction discharge means through which the coarse fraction discharges from the receiving chamber thus to control the rate of coarse fraction discharge in a manner whereby the density in the pool is kept substantially constant at a desired value for which the automatic control device can be set to function.

A practical example pertaining to the operation of the Figs. 1 to 8 embodiment, presents a combination of structural and operational data as follows:

According to one example a machine embodying this invention comprises a classifying pool approximately 2' x 2' square in plan view, and about 9" deep, with the sands discharge passage at the bottom about ½" high and the sands discharge weir about ¾" high to be somewhat higher than the sands passage adjustable edge members may be provided for adjustably varying the height of the sands passage.

As for the vibrating motion imparted to the bottom of the classifier pool, a practical or suitable operating range for the vibrating stroke under conditions in this example lies in a range of about 1/8" to about 1/4", while the stroke frequency covers a practical range of 600 to 1000 reciprocations per minute.

This operating example provides for a stroke length about 3/16" at a stroke frequency on the order of 700 reciprocations per minute. In this example the hydraulic water is supplied by a set of longitudinally extending parallel horizontal pipes having a clearance from the bottom of the pool of about 1/2", with center-to-center spacing between the pipes of about 6", and the center of each pipe in turn spaced a distance of about 3" from the respective side walls of the pool.

In the 2' x 2' pool, this would require a set of four pipes spaced 6" from one another, the two outer pipes being spaced 3" from the respective adjacent boundary wall of the pool.

The jet-emitting pipes are each about 2 feet long of 1/2" standard pipe, having .622 inside diameter and .840 outside diameter, with a spacing between the jet holes of 15/16" center-to-center, the jet holes themselves being drill holes produced with No. 37 drill, and having an area each of .00849 square inch, the nominal diameter of the drill hole being .1040 inch, and the total open area of the holes being 1.22 square inches for a total number of 144 holes. In this example the hydraulic water is emitted from the pipes by jets provided by a double row of jet orifices in each pipe so disposed that a row of jet openings at each side of each pipe would emit jets at an angle of about 20° below the horizontal. Head loss through the holes may be said to about 1 foot water column for a flow rate of 18 gallons per minute. The jet emitting pipes extend in the direction of vibration or reciprocation or reciprocation imparted to the bottom of the classification pool.

With a feed to the classifier pool consisting of a deslimed sands mixture having a range of sizes of —20 to —200 Tyler mesh and feeding 79.5 tons per day (dry weight) it is considered that about 59.0 tons per day (dry weight) pass through the underflow and 20.5 tons per day (dry weight) pass through the overflow; the separation in terms of the size of the "cut" was 250 microns with a "superelevation" being maintained at 3/4" and a supply of hydraulic operating water at the rate of 18 gallons per minute.

It was observed that these operating data and operating results do not change appreciably if the above specific load of 79.5 tons feed pulp (dry weight) handled by the machine is increased to about double that quantity and even beyond that. Although the feed pulp in this instance contains 45.2% solids, it was observed that variations in the feed dilution did not materially affect or vary the above operating results, nor do they materially affect the hydraulic water rate required for a certain separation. While the above data apply to a daily throughput of 79.5 tons, the machine is nevertheless rated for a full capacity of 150 tons per day (dry weight) without requiring any material change in the above operating conditions.

In its structurally more fully executed form (Figs. 13, 14, 15, 16) the Figs. 10 to 12 embodiment of the classifier apparatus comprises a tank 136 which has a pair of side walls 137 and 138, an end wall 139 at the feed end of the tank, and an end wall 140 at the discharge end of the tank, a bottom 141 which comprises a flat horizontal portion 141$^a$ and a hopper-shaped pocket portion 141$^b$. The end wall 139 has a large inspection opening 139$^a$ and a removable vertical cover plate 139$^b$; similarly, the opposite end wall 140 has a large inspection opening 140$^a$ and a removable vertical cover plate 140$^b$.

Within the tank 136 there is provided a pair of transverse partition walls 142 and 143 rigidly interconnecting the side walls 137 and 138 of the tank. Thus, the transverse partition walls 142 and 143 together with the sidewalls 137 and 138 constitute the peripheral vertical confines of the classifier pool "Q," to which slurry is fed as indicated by a feed chute 144. At the discharge end, the tank space between the end wall 140 and the transverse partition wall 142 is sealingly closed by a cover plate 145, while at the feed end the tank space between end wall 139 and the transverse partitions wall is sealingly closed by a cover plate 146.

The partition wall 142 has a lower free horizontal edge 147 and an upper free horizontal edge 148 which latter constitutes the overflow weir across which passes the fines fraction from the top zone of the classifier pool. The other partition wall 143 has a lower free horizontal edge 149 and an upper free horizontal edge 150 flush with the top edges of tank walls 137 and 138.

The classifier pool "Q" is further defined by an auxiliary bottom plate member 151 spaced a suitable distance "$s_1$," from the lower free edges of the partition walls 142 and 143, thereby constituting a sands discharge passage 152 defined by the distance "$s_1$" of the bottom plate 151 from the lower edge 147 of partition wall 142. More in particular, the bottom plate 151 has a horizontal flat intermediate- or body portion 151$^a$, a low upright portion 151$^b$ herein termed a submerged weir presenting a horizontal weir edge 151$^c$ slightly higher, by the differential "$s_2$," than the height "$s_1$" of the sands discharge passage 152.

At its opposite end or feed end the bottom plate member 151 comprises a high wall portion 151$^d$ spaced outwardly from the transverse partition wall 143 to provide between it and the partition wall 143 a sealing column "$Z_1$" of coarse fraction material overlain by a column "$Z_2$" of substantially clear water. The bottom plate member 151 has flanged side edge portions $E_1$ and $E_2$ each movably as well as sealingly connected along the entire length thereof to the tank walls 137 and 138 respectively, by means of correspondingly shaped diaphragms $T_1$ and $T_2$ respectively.

The mounting of the diaphragms $T_1$ and $T_2$ upon the tank wall is more clearly indicated in Figures 15, 16, 17 and it conforms to the configuration of the edge portions $E_1$ and $E_2$ of the bottom plate member. For example, diaphragm $T_1$ has a horizontal portion "$a$," a low vertical portion "$b$," and a high vertical portion "$c$." The edge portion "$E_1$" of the plate member is sealingly fastened to diaphragm "$T_1$" as by a correspondingly shaped holding strip "$F_1$" with bolts "$B_4$," while the peripheral margin of the diaphragm is sealingly fastened to tank wall 137 as by means of holding strip construction or frame "$F_2$" with bolts "$B_5$." Further detailed, each of the diaphragms $T_1$ and $T_2$ is thus marginally held or clamped to a correspondingly shaped flange $R_1$ and $R_2$ respectively, which flanges are part of correspondingly shaped neck portions $N_1$ and $N_2$ respectively extending from tank walls 137 and 138 respectively.

From the cover plate 145 rises a stack-like extension 153 of tank 136, in which is provided an overflow pipe 154 the top overflow edge 154$^a$ of which determines clear water level "$O_1$" a distance "$K_2$" above the overflow level "$O_2$" of the classifier pool, the distance $K_2$ representing the super-elevation. The stack-like extension 153 comprises an inner wall 153$^a$, an outer wall 153$^b$, and side walls 153$^c$ and 153$^d$. The overflow pipe 154 comprises a stack of removable ring portions whereby the clear water overflow level "$O_1$" is rendered adjustable.

In order to provide operating support and guidance for the horizontal reciprocatory movement of the bottom plate member 151, there are fixed to the underside thereof a pair of grooved members 155 and 156 at one side and a pair of grooved members 157 and 158 at the opposite side of the plate. Correspondingly, there are provided a pair of stationary guide members 159 and 160 operatively interengaging with grooved members 155 and 156 respectively, and a pair of stationary guide members 161 and 162 operatively interengaging with grooved members 157 and 158.

The required reciprocatory or vibratory motion is imparted to the bottom plate member 151 by means of a vibrating device 162a which comprises a vibrating unit 163 movably suspended from a stationary anchoring point 164 as by a hanger member 165. The vibrating unit is driven or actuated by a stationary motor 166 through an endless transmitting member 167. The vibrating unit has a bracket construction 168 which is rigidly connected by means of bolts "B6" to the edge portion "E1" of the bottom plate member through diaphragm T1 in such a manner that the vibrating unit 163 and the bottom plate member 151 together constitute a reciprocatory or vibratory mass to perform the motion indicated by double-headed arrows "W1" and "W2" (see Fig. 15).

Hydraulic operating water is introduced distributively into the bottom zone of the classifier pool by means of a set of parallel horizontal pipes 169, 170, 171 emitting jets 172 of operating water directed at the bottom 151 under a suitable angle "g" below the horizontal. Each of the parallel jet-emitting pipes has a pair of vertical feeder pipes, horizontal pipe 169 having the vertical feeder pipes 169a and 169b, horizontal pipe 170 having vertical feeder pipe 170a and 170b, and horizontal pipe 171 having extical feeder pipes 171a and 171b. The row of vertical feeder pipes 169a, 170a, 171a in turn have a horizontal supply header 172, and the row of vertical feeder pipes 169b, 170b, 171b have a horizontal supply header 173.

The horizontal supply headers 172 and 173 in turn are interconnected by a transverse supply leader 174 provided with control valve means (not shown).

The fines fraction flowing across the overflow edge 148 passes into a receiving launder 175 formed between the transverse partition wall 142 and the stack-like structure 153 to be delivered from one end of the launder as by a chute or spout 176.

The tank structure of this classifier apparatus is mounted upon and supported by a frame structure shown to comprise four corner post members 177, 178, 179, 180 suitably interconnected and braced with respect to one another as by diagonal members 181, 182 at the ends and by diagonal members 183 and 184 at the sides of the structure.

I claim:

1. Apparatus for the hydraulic classification treatment of pulp containing a mixture of particle sizes ranging from fine to coarse, to effect the separation of the mixture into a fraction of fines and a fraction of coarse size material, defined as undersize and as oversize particles respectively, which apparatus comprises a tank structure for containing a classifying pool having overflow means for a fines fraction and having said mixture supplied thereto in one portion thereof and said fractions discharged from other portions thereof, said tank structure comprising an internal wall structure defining the space of said pool proper and having stationary rising walls providing overflow discharge means for the fines fraction and presenting free horizontal bottom edges, and further comprising a horizontal reciprocatory bottom member spaced downwardly from the free bottom edges of said rising walls to provide a passage for said coarse fraction, said tank structure further comprising an external wall structure surrounding said internal wall structure and having a solid bottom to provide a sands receiving pockets spaced downwardly from said reciprocatory bottom member, top cover means rigidly interconnecting said external and internal wall structures, guide means for operatively supporting said reciprocatory bottom member to perform horizontal reciprocatory movements, an upstanding sands discharge weir provided edgewise upon said auxiliary bottom member and spaced outwardly from said passage in order that coarse fraction material migrating from said pool through said passage may spill across said weir into said sands receiving pocket, said outer and said inner wall structures together with said top cover means constituting a clear-water chamber holding a body of water in hydraulic balance with the pulp column in said pool, motion imparting devices for imparting said horizontal reciprocatory movements to said auxiliary bottom member, comprising a motion transmitting means extending from said bottom member through external wall structure, diaphragm means sealingly interconnecting said motion transmitting means with the surrounding portion of said wall structure, controllable means for removing coarse fraction material from said sands receiving pocket, and water supply means provided for admitting at the bottom of said pool hydraulic auxiliary water at a controllable rate distributively in a manner whereby the water in effect rises in substantially uniform distribution from the bottom and whereby there are adapted to be formed and maintained in said pool horizontal classification zones comprising a coarse sands zone of oversize particles at the bottom to be discharged into said sands receiving pocket, a fines zone of undersize particles at the top to discharge by way of said overflow means, an intermediate zone containing a mixture of undersize and oversize particles in teeter condition and means for controlling the rate of passage of said coarse fraction material from said pool into said receiving pocket for thereby controlling the cut between the undersize and the oversize.

2. Apparatus according to claim 1, in which the internal wall structure comprises a structure surrounded by said clear water chamber, and in which said sands discharge weir extends substantially along the entire periphery of said bottom member.

3. Apparatus according to claim 1, in which the internal wall structure comprises a structure substantially rectangular in plan view and surrounded by said clear-water chamber, and in which said sands discharge weir extends substantially along the entire periphery of said bottom member.

4. Apparatus according to claim 1, in which the external wall structure is rectangular in plan view, and in which the internal wall structure comprises a pair of transverse walls extending between and constituting with a pair of external walls the peripheral boundary of said pool, in which furthermore said guide means are so disposed as to provide for horizontal movement of said bottom member in a direction transversely of said pair of walls, with the addition of deformable means for sealingly interconnecting each of said walls with a respective adjacent end portion of the bottom member.

References Cited in the file of this patent

UNITED STATES PATENTS

| 302,816 | Bailey | July 29, 1884 |
| 1,544,999 | Lequeux | July 7, 1925 |
| 2,302,588 | Weber | Nov. 17, 1942 |

FOREIGN PATENTS

| 594,211 | Germany | Mar. 14, 1934 |